United States Patent [19]
Dittrich
[11] Patent Number: 4,989,637
[45] Date of Patent: Feb. 5, 1991

[54] GAS MIXING APPARATUS

[75] Inventor: Hans Dittrich, Karlsruhe, Fed. Rep. of Germany
[73] Assignee: Kernforschungszentrum Karlsruhe G.m.b.H., Karlsruhe, Fed. Rep. of Germany

[21] Appl. No.: 342,869
[22] Filed: Apr. 25, 1989
[30] Foreign Application Priority Data
May 3, 1988 [DE] Fed. Rep. of Germany ....... 3814917
[51] Int. Cl.[5] ........................ F17D 1/04; F16K 49/00
[52] U.S. Cl. .................................. 137/599; 137/341; 137/606
[58] Field of Search ................ 137/599, 606, 607, 341

[56] References Cited

U.S. PATENT DOCUMENTS

| | | | |
|---|---|---|---|
| 3,653,399 | 4/1972 | Steele | 137/341 |
| 3,670,768 | 6/1972 | Griswold | 137/606 |
| 4,008,736 | 2/1977 | Wittmann-Liebold et al. | 137/606 |
| 4,168,724 | 9/1979 | Graffunder et al. | 137/606 |
| 4,257,439 | 3/1981 | Mayeaux | 137/606 |
| 4,488,570 | 12/1984 | Jiskoot | 137/606 |
| 4,498,496 | 2/1985 | Barcellona et al. | 137/606 |
| 4,558,845 | 12/1985 | Hunkapiller | 137/606 |
| 4,705,669 | 11/1987 | Tsuji et al. | 137/606 |
| 4,741,354 | 5/1988 | DeMild, Jr. | 137/897 |

*Primary Examiner*—John Rivell
*Assistant Examiner*—L. R. Leo

[57] ABSTRACT

In a gas mixing apparatus for the generation of a continuous stream of a gas mixture a carrier gas line is in communication with a collector to which a carrier gas supply line and component gas supply lines are connected of which each includes a mass flow regulator and a three-way valve with an output in communication with the collector and a first inlet connected to the respective mass flow regulator and a second input in communication with the carrier gas supply line. The second inputs to the three-way valves are always open so that carrier gas is always permitted to flow through the valves for rapid response to flow changes through the valves first inlet.

5 Claims, 2 Drawing Sheets

GAS MIXING APPARATUS

BACKGROUND OF THE INVENTION

The present invention relates to a gas mixing apparatus adapted to generate a continuous gas mixture flow consisting of a main stream of a carrier gas to which one or more gas components are added in measured quantities.

The continuous gas stream is generated with exactly defined components with very high accuracy and very short adjustment periods.

Gas mixing apparatus utilizing diaphragms with various apertures have been utilized; but they permit only stepwise adjustment of the gas mixture composition. They also generate large amounts of excess gases. Also gas mixing apparatus with thermal mass flow regulators have become known. However, the accuracy of the thermal mass flow regulators depends greatly on the temperature of the environment in which they are utilized. Wall effects and particularly dead volumes cause delay effects during changes in concentration, that is, during changes of the compositions of the gas stream.

It is the principal object of the present invention to provide a gas mixing apparatus in which the composition of the gas is infinitely variable, in which only small amounts of excess gas are generated and in which the dead volumes present in the mixing control elements are very small.

SUMMARY OF THE INVENTION

In a gas mixing apparatus for the generation of a continuous stream of a gas mixture a carrier gas line is in communication with a collector to which a carrier gas supply line and component gas supply lines are connected of which each includes a mass flow regulator and a three-way valve with an output in communication with the collector and a first inlet connected to the respective mass flow regulator and a second input in communication with the carrier gas supply line. The second inputs to the three-way valves are always open so that carrier gas is always permitted to flow through the valves for rapid response to flow changes through the valves first inlet.

The carrier gas supply line also includes a mass flow regulator and an on-off valve and the three-way valves of the component gas supply lines have their second inputs preferably connected to a common distribution line which is connected to said carrier gas supply line downstream of the on-off valve.

With this arrangement in which the flow through the component gas supply valves is always relatively high no matter how small the amount of component gas is which is admitted by the respective mass flow regulator, the component gas is rapidly transferred to the collector so that response time to a change in the composition of the gas mixture is practically instant.

Preferably the apparatus components are all disposed within an insulated housing provided with a heater to maintain them at a desired temperature in order to avoid the influence of temperature variations and also preferably the collector is insulated and provided with a heater to maintain it at a temperature higher than the housing temperature in order to avoid adsorption of component gases on the collector walls.

The apparatus conduits and valves have no dead volume since the carrier gas always flows through the valves and the admission lines which are present between the mixing valves and the gas mixture conduit. Extremely fine dosing adjustments can be executed in this manner without substantial loss of gas components.

Further advantages of the apparatus according to the invention are that a plurality of components can be admixed to the carrier gas stream in the same efficient manner, that the apparatus may easily be maintained at a constant temperature and that the collection conduit for the gas mixture can be heated independently.

SHORT DESCRIPTION OF THE DRAWINGS

FIG. 1 shows schematically the gas mixing apparatus according to the invention; and FIGS. 2A and 2B show schematically a three-way component flow supply line valve in component gas supply (*2a*) and shut-off (*2b*) positions.

DESCRIPTION OF A PREFERRED EMBODIMENT

The gas mixing apparatus according to the invention is designed to provide a continuous gas mixture stream of a plurality of components if so desired—for example, eight components as shown in the example given in the figure—and whose composition is easily and continuously variable.

Figure 1:
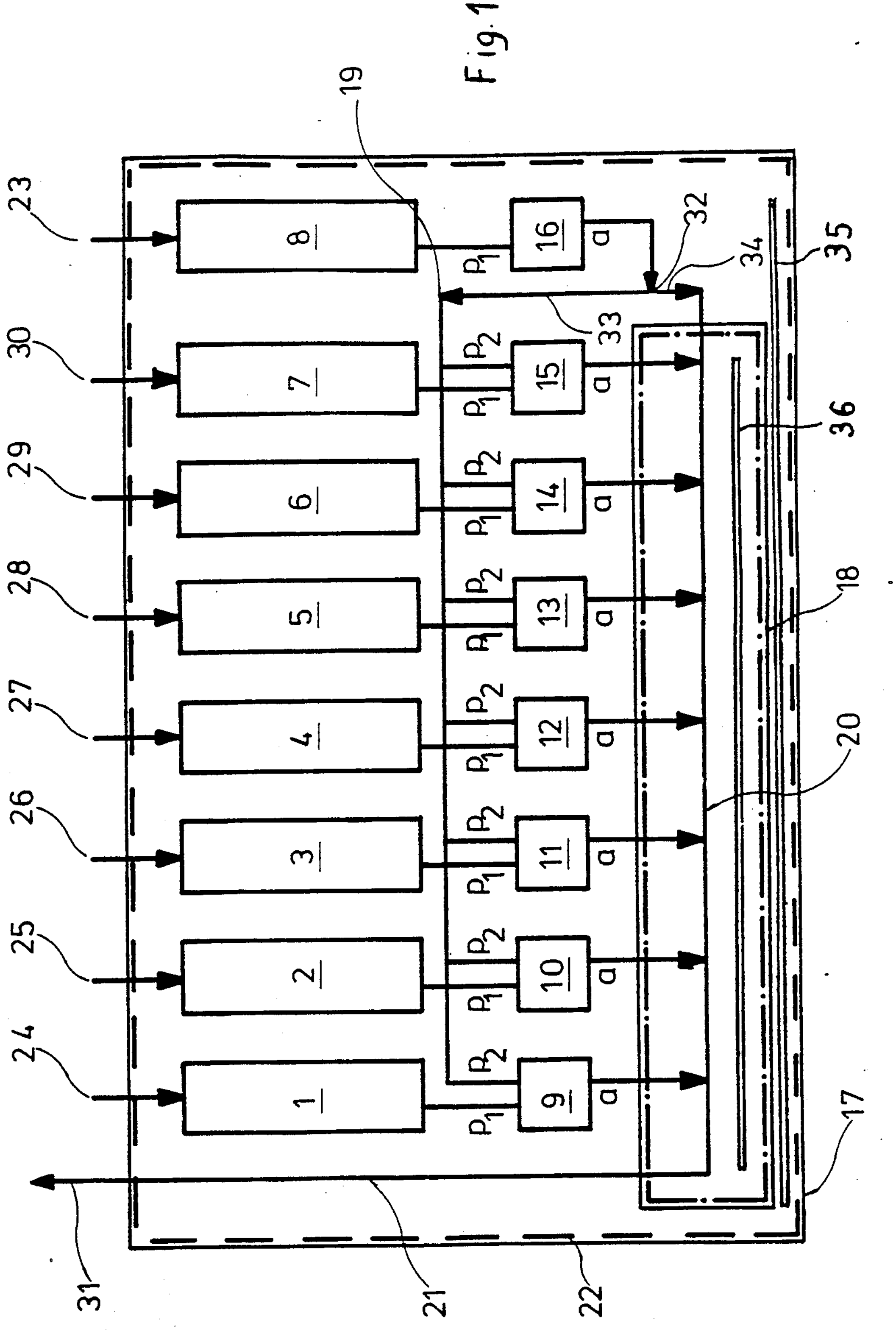

As shown in FIG. 1 the apparatus is disposed within an outer housing 17 which is provided with an insulating material liner 22. The carrier gas is supplied by way of a supply line 23 which extends through the housing 17 and the seven admixture gases are supplied into the housing 17 by way of admixture gas supply lines 24 to 30 whereas the gas mixture leaves the apparatus by way of the gas mixture supply line 31. A heater 35 is provided in the housing and controlled so as to maintain within the housing 17 a constant temperature within the range of 40° C. to 75° C.

Each of the gas components admitted through the supply lines 24 to 30 for admixture to the carrier gas is first conducted through a thermal mass flow regulator 1 to 8. Downstream of each mass flow regulator 1 to 8 there is a magnetically operated valve 9 to 16 with an input line P1 connected to the respective mass flow regulator. For controlling admixture of component gases there are provided the magnetic valves 9 to 15 which are three-way valves with inputs P1 and P2 and single outputs a. The valve 16 for the carrier gas is a two-way (on-off) valve with a single input P1 and an output a.

Figure 2A:
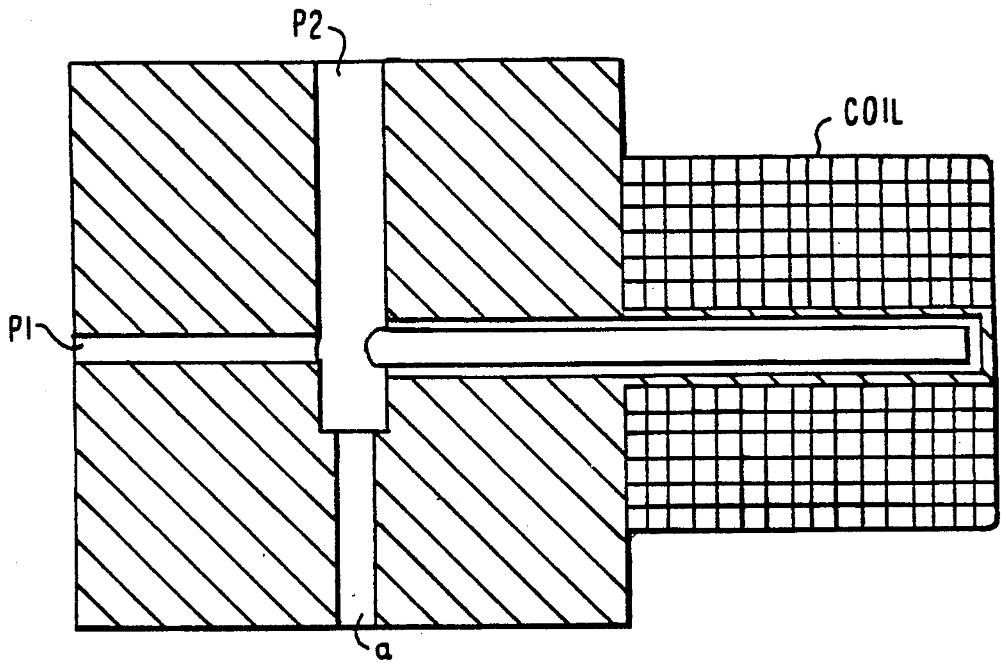
Figure 2B:
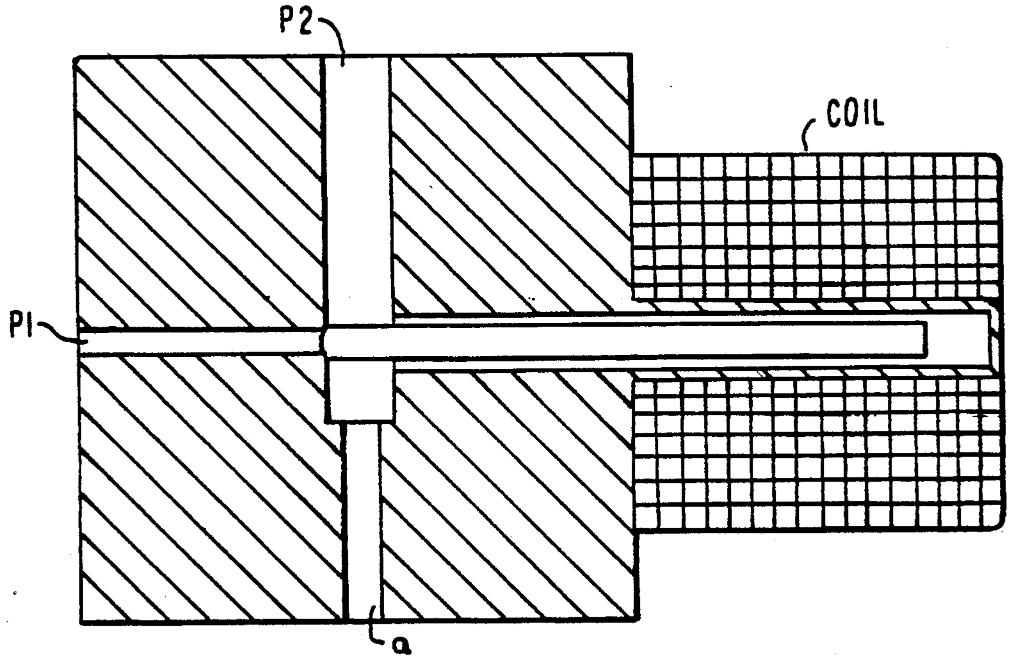

All magnetic valves have two control positions. The valve 16 is simply an on-off valve, the other valves 9 to 15 are three-way valves which are modified in such a manner that the carrier gas inputs P2 are always in communication with the outlets a whereas the component gas inlets P1 are selectively open or closed, that is, the valves 9 to 15 are operated as admixing valves: Only they are used as two-position valves (FIGS. 2A, 2B) wherein the inputs P1 can be closed with regard to the outputs a, the inputs P2 are always open for passage of carrier gas through the valves.

Downstream of the two-way valve 16 the carrier gas stream is divided at the T 32 into two partial streams passing through lines 33 and 34. Line 33 is connected to a distributor line 19 which is in communication with the various valve inputs P2 of the admixing valves 9 to 15. The other partial stream line 34 is connected to the collector conduit 20 in which the final gas mixture is formed. The collector conduit 20 which is preferably tubular is surrounded by a heat insulating layer 18 and includes a collector heating element 36 which permits the collector conduit to be maintained at a temperature higher than the temperature otherwise maintained within the housing 17. A discharge line 21 connected to the collector conduit 20 carries the completed gas mixture through the housing wall and, outside the housing 17, becomes the gas mixture supply line 31. The apparatus according to the invention is equipped with the desired amount of mass flow controllers and valves. There may be provided less than eight such devices if the number of component gases is smaller than seven.

OPERATION OF THE APPARATUS ACCORDING TO THE INVENTION

In the deenergized (off) position of all the magnetic valves 9 to 16 their inlets P1 are blocked such that no gas flow exists anywhere. To start the mixing procedure first valve 16 is opened such that the carrier gas flow is established through the collector conduit and all the valves 9 to 15 whereupon for all the component gases to be admixed the respective magnetic admixing valves 9 to 15 are energized so that the inlets P1 of the respective valves are opened and the respective component gases are permitted to pass. By means of the mass flow regulators 1 to 8 the respective gas streams are maintained at the desired levels so that within the collector conduit a gas flow of the desired composition and the desired mass flow value is generated.

The magnetic valves 9 to 16 and the mass flow regulators 1 to 8 are electrically operated and controlled by a separate electronic control unit. Temperature control of the interior of the housing 17 maintains a constant temperature for the electronic components and the mass flow regulators so that detrimental effects of temperature variations are eliminated and dosing accuracy is substantially improved.

In order to eliminate non-linearities for the mass flow regulators the control units memory is provided with a correction curve for each of the mass flow regulators which is then utilized by the control unit to generate the desired setpoint signal such that optimal accuracy is achieved.

The modification of the admixing valves 9 to 15 with open passages from inputs P2 to outlets a provides for a constant flow of carrier gas through the distribution line 19 and through the valves 9 to 15. The valves 9 to 15 are therefore constantly flushed and any gases admitted through their inlets P1 are immediately carried to the collector 20 even if the flow volume of such admitted gases is only very small. As a result also adjustment times after changes of the gas mixture composition are very small and delay effects caused by gas components remaining in valve chambers and in admission lines to the collector 20 are eliminated.

Heating of the collector prevents adsorption of gases on the inner surfaces of the collector. All together the features of the arrangement according to the invention provide for a minimum response time upon a change of the gas composition.

In addition to general off positions and operating positions for the valves there is provided a special flushing position in which all the inlets P1 of the valves 9 to 15 are closed but valve 16 is open so that carrier gas flows through all the valves 9 to 15 and also directly into the collector 20. In this instance all the valves and all the pipes are flushed from any component gases. For such a procedure the arrangement according to the invention provides for short-flushing times particularly if the collector 20 is heated at the same time.

LIST OF REFERENCE NUMERALS

1 to 8 Mass flow regulators
9 to 15 Electromagnetic three-way admission valves
16 Two-way (on-off) valve
17 Outer housing
18 Heat insulating liner
19 Distribution line
20 Collector
21 Discharge line
22 Heat insulating layer
23 Carrier gas supply line
24 to 30 Component gas supply lines
31 Gas mixture supply line
32 T structure
33 Partial stream line
34 Partial stream line
35 Housing heater
36 Collector heating element
P1 Valve inlet
P2 Carrier gas inlet of admixing valves
a Valve outlet

What is claimed is:

1. A gas mixing apparatus for the generation of a continuous stream of a gas mixture consisting of a main stream of a carrier gas and a number of components added thereto in measured quantities, said apparatus including a carrier gas supply line, a collector in communication with said carrier gas supply line and adapted to receive the gas mixture, a component gas supply line connected to said collector for each of the component gases to be admixed to said carrier gas, each of said component gas supply lines including a mass flow regulator and a three-way valve with an output in communication with said collector and two inlets of which the first one which is in communication with the respective mass flow regulator is adapted to be selectively closed said carrier gas supply line including for each of said three-way valves a branch line connected to the second inlet such that said second inlets are in direct communication with the main carrier gas stream, said second inlets being always open so that pure carrier gas is always permitted to flow through each three-way valve.

2. An apparatus according to claim 1, wherein said carrier gas supply line also includes a mass flow regulator and further an on-off valve for controlling the supply of carrier gas.

3. An apparatus according to claim 2, wherein the second inlets of said three-way valves are connected to a common carrier gas distribution line which is connected to said carrier gas supply line downstream of said on-off valve.

4. An apparatus according to claim 3, wherein said collector, said mass flow regulators, said valves and all interconnecting lines are disposed in a heat insulated housing into which the carrier gas and the component gases are introduced and from which the desired gas mixture is discharged, said housing including a heater structure for maintaining a predetermined temperature within said housing.

5. An apparatus according to claim 4, wherein said collector is thermally insulated and includes a collector heating structure adapted to maintain the collector at a temperature higher than the housing temperature.

* * * * *